United States Patent [19]
Zierden et al.

[11] Patent Number: 5,897,107
[45] Date of Patent: Apr. 27, 1999

[54] ROLLER BUSHING ASSEMBLY

[75] Inventors: Dean Zierden, Maple Grove; James P. LeClaire, St. Paul, both of Minn.

[73] Assignee: Horton, Inc., Minneapolis, Minn.

[21] Appl. No.: 08/806,525

[22] Filed: Feb. 24, 1997

[51] Int. Cl.[6] .................................................. B25G 3/28
[52] U.S. Cl. ..................... 267/267; 29/898.07; 267/269; 384/548; 384/559; 384/582; 403/282
[58] Field of Search .................................. 267/267, 260, 267/264, 265, 268–271, 50, 263; 29/525, 510–518, 898.07; 403/282, 274, 280, 276, 278, 38, 62, 118, 224, 226, 228, 359; 384/559, 569, 548, 560, 561, 441, 474, 582, 577, 570, 585, 584; 264/274; 188/375

[56] References Cited

U.S. PATENT DOCUMENTS

| 1,257,197 | 2/1918 | Dowd ....................................... 384/401 |
| 1,539,179 | 5/1925 | Goodwin ................................. 267/267 |

(List continued on next page.)

FOREIGN PATENT DOCUMENTS

| 557253   | 8/1923  | France . |
| 792163   | 12/1935 | France . |
| 1047719  | 12/1953 | France . |
| 2675864  | 10/1992 | France . |
| 430292   | 6/1926  | Germany . |
| 915401   | 7/1954  | Germany . |
| 1945936  | 9/1969  | Germany . |
| 3338507  | 11/1984 | Germany . |
| 4017424  | 12/1991 | Germany . |
| 19524600 | 1/1997  | Germany . |
| 318272   | 2/1957  | Sweden . |
| 168666   | 9/1921  | United Kingdom . |
| 1036181  | 7/1966  | United Kingdom . |
| 1186430  | 4/1970  | United Kingdom . |
| 2147972  | 5/1985  | United Kingdom . |
| 2155563  | 9/1985  | United Kingdom . |
| 2225615  | 6/1990  | United Kingdom . |

OTHER PUBLICATIONS

Technische Rundschau, vol. 48 No. 4, Jan. 27, 1956, BERN CH, pp. 9–15, E. Gallasch: "Käfiggeführte Nadellager".

Marks' Standard Handbook for Mechanical Engineers, Eighth Edition, (US, pp. 8–136 to 8–141) "Bearings With Rolling Contact".

Product Engineering, vol. 20 No. 2, Feb. 1949 (New York, US, pp. 130–131) "Housings and Mountings for Ball and Roller Bearings".

*Primary Examiner*—Douglas C. Butler
*Attorney, Agent, or Firm*—Alan Kamrath; Peterson Wicks Nemer & Kamrath PA

[57] ABSTRACT

A roller bushing assembly (21d, 21e, 21f) designed to enable a low tolerance, frictional fit within an out-of-round or otherwise distorted support member (5, 9) includes a bushing member (29a, 216) having an outer surface (102) machined to provide various axially spaced, annular grooves (127–130, 132 and 242–250). Between or directly adjacent respective ones of the annular grooves (127–130, 132 and 242–250) are defined a plurality of axially spaced and radially extending ribs (113–122 and 232–240). The axial outermost ribs (113, 122 and 240) are preferably elongated relative to the remaining ribs (114–121 and 232–239) and have annularly chamfered portions (124, 125 and 252). The ribs (113–122 and 232–240) are adapted to shear upon mounting of the bushing member (29a, 216) within an out-of-round or otherwise distorted support. By providing the shearable ribs (113–122 and 232–240), the bushing assembly (21d, 21e, 21f) can be effectively mounted within a greater range of varying sized support members. In accordance with a first embodiment, the bushing member constitutes a sleeve (29a) within which is mounted at least one bearing unit (33, 34). The shearing of the ribs (113–122) assures that the bearing unit (33, 34) will not be excessively pre-loaded in a radial direction.

44 Claims, 2 Drawing Sheets

U.S. PATENT DOCUMENTS

| | | | |
|---|---|---|---|
| 1,569,240 | 1/1926 | Searles . | |
| 1,701,474 | 2/1929 | Harris . | |
| 1,749,848 | 3/1930 | Roos | 267/267 |
| 1,757,700 | 5/1930 | Bechert . | |
| 1,757,747 | 5/1930 | Searles | 267/267 |
| 1,813,708 | 7/1931 | Olcott . | |
| 1,853,043 | 4/1932 | Gay | 267/271 |
| 1,872,814 | 8/1932 | Riblet | 267/267 |
| 1,971,967 | 8/1934 | Searles | 267/267 |
| 1,974,590 | 9/1934 | Steeneck | 267/267 |
| 2,037,156 | 4/1936 | Taplin . | |
| 2,170,455 | 8/1939 | Leighton . | |
| 2,178,692 | 11/1939 | McIntyre . | |
| 2,191,528 | 2/1940 | Hewel | 267/271 |
| 2,240,894 | 5/1941 | Roberts . | |
| 2,251,843 | 8/1941 | Jones . | |
| 2,259,827 | 10/1941 | McReynolds . | |
| 2,324,997 | 7/1943 | Brown . | |
| 2,333,183 | 11/1943 | Jones . | |
| 2,679,391 | 5/1954 | Roberts . | |
| 2,691,520 | 10/1954 | Joseph . | |
| 2,779,641 | 1/1957 | Sutowski . | |
| 3,083,449 | 4/1963 | Simmons . | |
| 3,208,134 | 9/1965 | Krewson, Jr. . | |
| 3,365,256 | 1/1968 | Dardani et al. . | |
| 3,372,963 | 3/1968 | Harris . | |
| 3,405,982 | 10/1968 | Krenn . | |
| 3,501,210 | 3/1970 | Deutsch . | |
| 3,639,961 | 2/1972 | Shiflet . | |
| 3,643,989 | 2/1972 | Sattler . | |
| 3,704,922 | 12/1972 | Kleinschmidt et al. . | |
| 4,003,562 | 1/1977 | Kaiser et al. . | |
| 4,083,545 | 4/1978 | Herbenar . | |
| 4,089,612 | 5/1978 | Mazzeo . | |
| 4,213,660 | 7/1980 | Yasui et al. . | |
| 4,429,927 | 2/1984 | Kawabata . | |
| 4,433,875 | 2/1984 | Walter et al. . | |
| 4,611,933 | 9/1986 | Hofmann et al. . | |
| 4,671,680 | 6/1987 | Hauser et al. . | |
| 4,966,472 | 10/1990 | Link . | |
| 5,033,903 | 7/1991 | Olsson et al. . | |
| 5,062,721 | 11/1991 | Chiba . | |
| 5,090,755 | 2/1992 | Garnweidner . | |
| 5,261,650 | 11/1993 | Hein . | |
| 5,310,268 | 5/1994 | Schlereth . | |
| 5,527,115 | 6/1996 | Zepp et al. . | |
| 5,562,348 | 10/1996 | Link . | |

ROLLER BUSHING ASSEMBLY

BACKGROUND OF THE INVENTION

The present invention pertains to the art of bushings and, more specifically, to a bushing assembly particularly adapted for use in attaching a leaf spring of a vehicle suspension to a truck chassis. The invention is also directed to an improved method of installing a bushing assembly in a leaf spring suspension system or other support.

It is widely known in the vehicle art to utilize leaf springs in vehicle suspension systems. In particular, it is common to utilize leaf springs in rear suspension assemblies for both light and heavy-duty trucks. In such a suspension arrangement, the leaf spring is attached to a chassis of the truck at terminal support locations. More specifically, each end of the leaf spring is bent to form a spring eye which is attached to the chassis through a support member, generally constituted by either a bracket or a shackle. The leaf spring is preferably attached to the support member via a bushing assembly in order to provide rotational movement between the end of the leaf spring and the support member. Such rotation is desirable in order to provide enhanced suspension characteristics. Conversely, if the ends of the spring are supported in a fixed manner, such as when the spring/support connection freezes up, the leaf spring would essentially act as a cantilevered spring and thus provide deteriorated suspension characteristics.

In seeking to provide a high quality leaf spring support arrangement designed to maintain desirable suspension characteristics for prolong periods, improvements in the design of roller bushings utilized in connecting a leaf spring to a suspension support have been proposed. For example, U.S. Pat. No. 5,562,348 is directed to a compact roller bushing assembly, designed to rotatably connect an eye of a leaf spring to a chassis bracket, which generally requires less scheduled maintenance than prior known arrangements while sustaining relative rotation between the leaf spring and the truck chassis. Although this patented arrangement does provide an assembly which prevents the spring/support connection from freezing up and can be readily retrofitted to existing suspension systems, the arrangement does present some problems. For instance, the typical eye of a leaf spring often tends to be either too small or "out of round", i.e., not perfectly cylindrical, such that the tolerances between the outside diameter of the bushing assembly and the inside diameter of the spring eye can be extremely small. In this situation, a spring eye expander must be used to install the roller bushing assembly within the spring eye. This is the preferred installation method outlined in the '348 patent. However, such an installation method can place extra pressure on the roller bushing assembly, directly through the outer sleeve thereof, which can lead to various system problems. For instance, roller bearings, which are typically pre-mounted within a bushing sleeve, may be forced or shelled out of the bushing sleeve upon installation of the sleeve within the spring eye. In addition, the radial forces exerted on the bearing assembly can deform the sleeve and bearings such that the insertion of a chassis bracket pin therein is made difficult. In other words, the sleeve and bearing assembly become too small to allow the pin to be removed or reinstalled. Furthermore, the overall bearing and pin life can be significantly reduced if excessive pre-loads are applied to the bushing assembly. Such a pre-loading problem can occur, for example, when a bushing sleeve is forced into an out-of-round or small (low side of tolerance) spring eye thereby causing excessive radial forces to be applied to the sleeve which deforms the cylindrical shape of the inner surface of the sleeve. This deformation, in turn, can crush the bearing assembly and lead to premature failure thereof.

Therefore, this prior proposed roller bushing system may have practical limitations regarding its use in connection with spring eyes which are out-of-round to a certain degree at a low side of a tolerance fit range. In addition, considering that a rather extreme tolerance, i.e., in the order of 0.0005 inches (0.0127 cm), must be established between the outside surface of the bushing assembly and the support in order for the sleeve of the bushing assembly to be properly secured in position, the applicability of this system may also be effectively limited to a rather small tolerance range between a given bearing sleeve and support.

In the art of bearings in general, additional proposals have been made directed to establishing an interference connection between a bearing assembly and a support, even when the bearing is to be mounted in an out-of-round support member or journal. For example, U.S. Pat. No. 3,365,256 discloses a process in which several coating layers of a shearable material are applied and heat cured to an outer race of a bearing prior to mounting of the bearing within an irregularly surfaced or contoured support aperture. In accordance with this patented arrangement, the various layers can be readily sheared when the bearing is forced into the support aperture such that any gaps between an outer surface of the bearing and an inner surface of the support are filled by the shearable material. Unfortunately, this arrangement suffers from various drawbacks, including the additional material and manufacturing costs associated with applying coating after coating of extra material on either the outer surface of the bearing or, presumably, the inner surface of the support member or journal. In addition, as the shearable material is made from a different material than the bearing itself, this interface is susceptible to degradation which would result in undesirable relative rotation between the outer bearing race and the support.

Other proposed solutions to this problem of establishing a suitable fit between a bearing and a support are presented in U.S. Pat. Nos. 4,429,927 and 4,671,680. According to each of these patented arrangements, a support or journal is provided with a plurality of radially inwardly extending protrusions prior to receiving the bearing. These protrusions are able to either elastically or plastically deform to accommodate dimensional discrepancies between the components.

Unfortunately, such arrangements are not practical in the truck suspension environment due to the fact that the protrusions would have to be correspondingly formed in the spring eye portion of the leaf spring itself, which is the out-of-round portion of the entire assembly. Not only would it be extremely difficult, if not impossible, to accurately form such protrusions in a newly formed spring eye, but such an arrangement would certainly not be applicable in retrofitting existing suspension systems in need of bushing repair.

Based on the above, there exists a need in various environments for a bushing assembly including a sleeve which can be effectively, frictionally received within a support member without unduly pre-loading bearings mounted internally in the sleeve. More generally, there exists a need for a bushing assembly including a bushing member that can be effectively frictionally mounted within an internal bore of a support member, even when the bore has a size and shape within a predetermined tolerance range from an ideal size and shape. There particularly exists a need in the art of vehicle suspensions for a bushing assembly which can be mounted, without the use of a pre-loading expander, in an out-of-round or small tolerance spring eye of a leaf spring. In addition, there exists the need for a roller bushing assembly which can be installed in an out-of-round eye of a leaf spring while still establishing a tight frictional fit with the spring eye so as to present an improved roller bushing assembly having an increased useful life with minimal maintenance.

SUMMARY OF THE INVENTION

The present invention solves these and other deficiencies and problems related to mounting a roller bushing assembly within an out-of-round support by providing an improved roller bushing assembly which assures a close tolerance fit. The invention is particularly applicable in rotatably connecting a leaf spring to a vehicle support, such as a truck chassis bracket or a shackle.

In accordance with the invention, the roller bushing assembly includes a bushing member having a cylindrical outer surface provided with several axially spaced and radially extending ribs that are designed to shear when an interference fit exists as the bushing member is mounted within the spring eye. In other words, as the bushing member is slid into an eye of a leaf spring, the ribs on the outer surface of the bushing member will shear to accommodate any distortion in the shape of the spring eye. Therefore, with this arrangement, an eye expander is not needed to mount the bushing member within the eye of the spring.

In accordance with a first preferred embodiment of the invention, the bushing assembly includes a sleeve that is adapted to be mounted in the spring eye or other support. Ribs are formed on the outer circumferential surface of the sleeve by machining the surface to create various axially extending and spaced, annular grooves. The ribs are therefore defined between the grooves and are made integral with the housing. With this arrangement, there is no risk of the ribs becoming disengaged from the housing such that a major concern with the known prior art is avoided. The bushing assembly includes at least one bearing unit that is pre-mounted within the sleeve such that the entire bushing assembly can be readily mounted within a spring eye as a unit in a cost efficient manner for extended periods of use, while avoiding the potential for creating excessive radial loads on the internal bearings of the assembly which could lead to premature failure. This arrangement provides for a close tolerance fit between the sleeve of the bushing assembly and the eye of the leaf spring, even if the spring eye is out-of-round, without pre-loading of the bearing(s) provided within the bushing assembly.

In accordance with a second preferred embodiment of the invention, the bushing assembly includes a bushing member in the form of a pin that is adapted to be mounted in the spring eye or other support. To provide a close tolerance fit, even if the spring eye or other support is out-of-round or otherwise distorted in size and shape, a plurality of axially spaced ribs are formed on the outer circumferential surface of the pin by machining annular grooves in a manner similar to the ribs formed on the sleeve of the first embodiment. The bushing assembly of this second embodiment is particularly adapted to be used in combination with a shackle assembly through which a leaf spring can be attached to a vehicle chassis for relative rotational movement. When used in this environment, the pin of the bushing assembly is press-fit within the spring eye with the ribs shearing as needed to compensate for size and shape distortions of the spring eye. The axial ends of the pin define stub shafts which are adapted to be received in bearing pockets formed in opposing links of the shackle assembly with axial thrust and radial roller bearings being interposed between the shackle link and the stub shaft within a respect bearing pocket. The roller and thrust bearings are preferably pre-assembled into a unit that includes a cap member having an internal bore within which a respective stub shaft is directly or indirectly press-fit. Pre-assembling the bearing unit in this manner enables the unit to be pre-lubricated and then sealed in order to alleviate the need for further maintenance, while also minimizing the number of parts that must be handled when interconnecting an end of a leaf spring to a truck chassis through the combination shackle and bushing assembly in accordance with the invention.

It is thus an object of the present invention to provide a roller bushing assembly comprising a bushing member having a cylindrical outer surface provided with radially extending and axially shearable ribs.

It is another object of the present invention to provide a roller bushing assembly including a bushing member having an outer surface which is machined to create radially extending ribs that are adapted to shear upon press-fitting the bushing member in an out-of-round or otherwise distorted support member.

It is a further object of the invention to provide a bushing assembly with a sleeve which can be mounted, in a low tolerance fit manner, within a support without excessively pre-loading bearings mounted within the sleeve.

It is a still further object of the invention to provide a bushing assembly that can be used in combination with a shackle assembly to rotatably mount an end of a leaf spring to a truck chassis with a minimum number of assembly components, while minimizing potential wear surfaces and the need for bearing maintenance.

Additional features and advantages of the ribbed roller bushing assembly of the present invention and its method of assembly will become more readily apparent from the following detailed description of the preferred embodiment thereof when taken in conjunction with the drawings wherein like reference numerals refer to corresponding parts in the several views.

Figure 1:
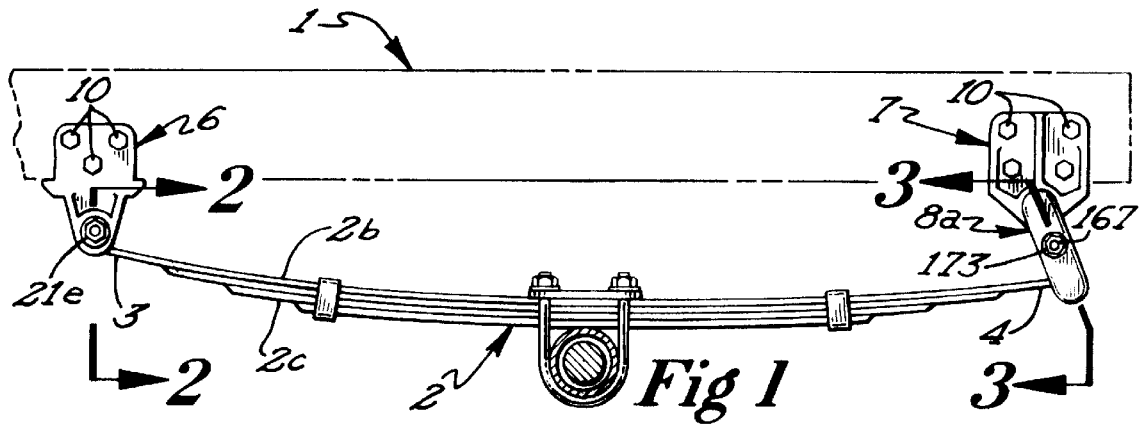
FIG. 1 is a partially broken away side elevational view of a leaf spring suspension system incorporating the roller bushing assembly of the present invention.

At this point, it should be noted that all of these figures are drawn for ease of explanation of the basic teachings of the present invention only; the extension of the figures with respect to the number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength and similar requirements will likewise be within the skill of the art after the following teachings of the present invention have been read and understood.

Where used in the various figures of the drawings, the same numerals designate the same or similar parts. Furthermore, when the terms "both", "first", "second", "inner", "outer", "radially", "axially", "circumferentially", and similar terms are used herein, it should be understood that these terms have reference only to the structure shown in the drawings as it would appear to a person viewing the drawings and are utilized only to facilitate describing the invention.

DETAILED DESCRIPTION

Two embodiments of a roller bushing assembly according to the preferred teachings of the present invention are shown in the drawings in a preferred field of use, i.e., for use in a vehicle suspension system for a truck or the like. In the most preferred embodiment of the present invention, the roller bushing assembly is an improvement of the type shown and described in U.S. Pat. No. 5,562,348. For purpose of explanation of the basic teachings of the present invention, the same numerals designate the same or similar parts in the present figures and the figures of U.S. Pat. No. 5,562,348. The description of the common numerals and the roller bushing assembly may be found herein and in U.S. Pat. No. 5,562,348, which is hereby incorporated herein by reference.

Referring to FIG. 1, it can be seen that a leaf spring 2 is connected to a chassis rail 1 by a forward end chassis bracket 6 at a forward spring end 3 and by a rear end chassis bracket 7, in combination with a spring shackle assembly 8a, at a rear spring end 4. More specifically, the spring shackle assembly 8a is rotatably attached to rear chassis bracket 7 through a bushing assembly 21d (see FIG. 3); front spring end 3 is bent to form a front spring eye 9 (see FIG. 2) that is rotatably attached to the front chassis bracket 6 through a bushing assembly 21e; and the rear spring end 4 is bent to form a rear spring eye 5 (see FIG. 3) that is rotatably attached to spring shackle assembly 8a by a bushing assembly 21f. In turn, front and rear chassis brackets 6 and 7 are fixedly secured to chassis 1 by bolts 10.

A first aspect of the present invention is particularly directed to the structure of bushing 21e. Initially, it should be realized that the roller bushing assembly of the present invention could be used in various environments outside the art of suspensions. Therefore, the vehicle suspension of FIG. 1 is presented for exemplary purposes only. In general, with the exception of the roller bushing assembly of the invention, FIG. 1 illustrates a known leaf spring suspension system wherein leaf spring 2 actually includes multiple leaf spring members, such as those labeled 2b and 2c, that are connected together through a central clamping assembly, as well as a pair of longitudinally spaced clamping brackets, as typically provided in a heavy truck-type suspension.

Figure 2:
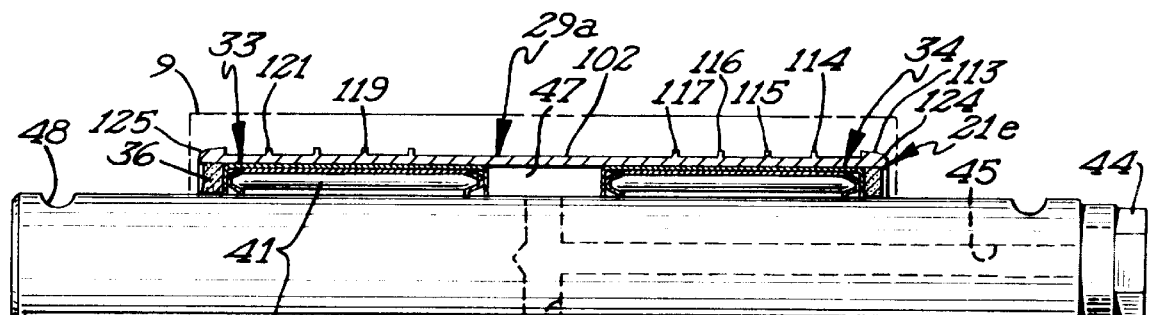
FIG. 2 is an enlarged cross-sectional view of a front portion of the suspension system according to section line 2—2 of FIG. 1 illustrating the mounting of a first preferred embodiment of the roller bushing assembly within an eye of a leaf spring.
Figure 3:
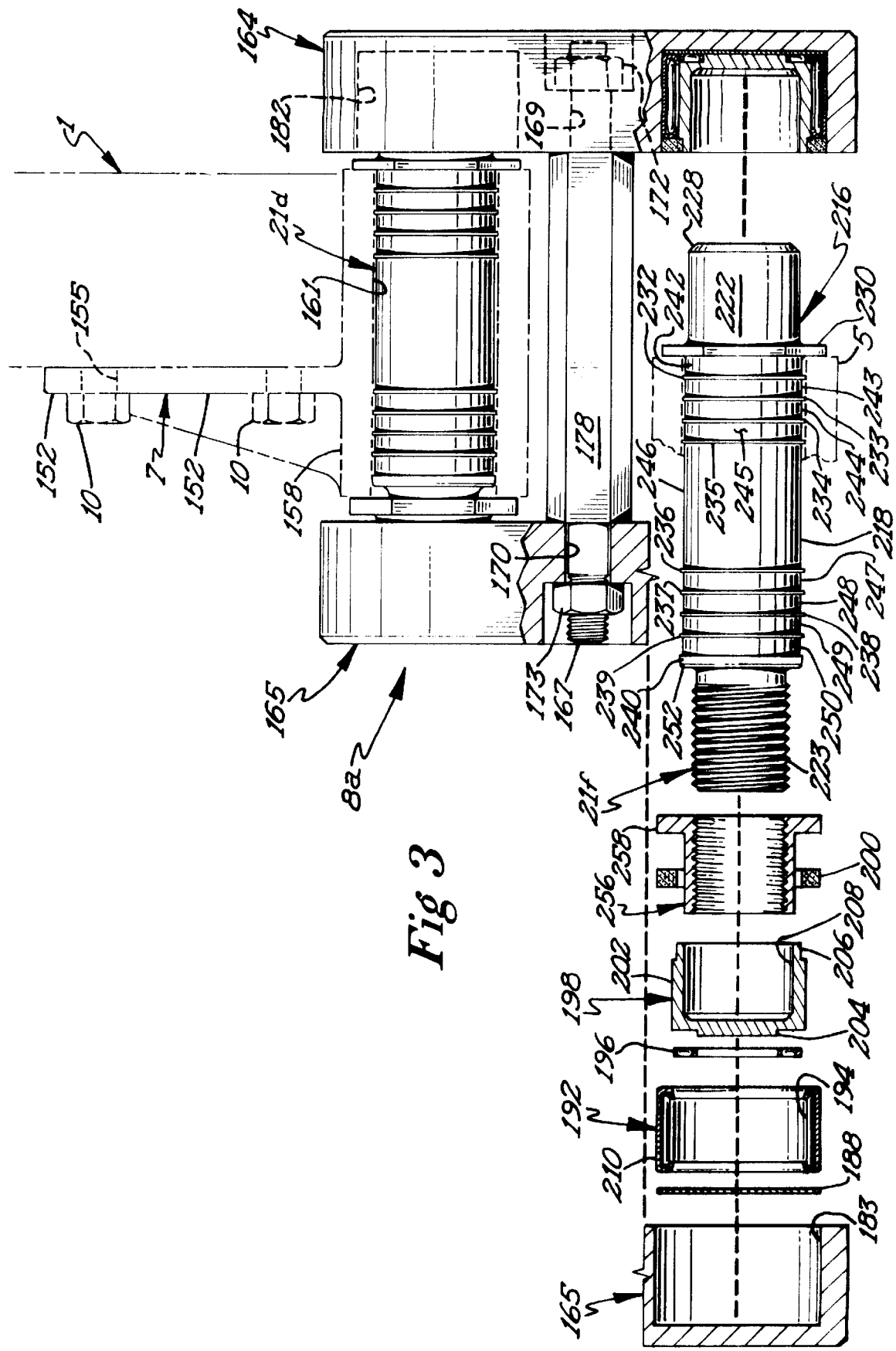
FIG. 3 is a partially exploded, cross-sectional view of a rear portion of the suspension system according to section line 3—3 of FIG. 1 illustrating the manner in which a roller bushing assembly constructed in accordance with a second embodiment of the invention is used in combination with a shackle assembly to rotatably mount a leaf spring to a truck chassis.

Turning now to FIG. 2, shown mounted within spring eye 9 is roller bushing assembly 21e constructed in accordance with a first preferred embodiment of the invention. As shown, roller bushing assembly 21e of the invention includes a cylindrical, tubular housing in the form of a sleeve 29a, the specifics of which will be detailed below. As is found in the roller bushing disclosed in U.S. Pat. No. 5,562,348, roller bushing sleeve 29a has mounted therein inner and outer bearing assemblies 33 and 34 which are disposed at either end of sleeve 29a so that they equally transmit loads exerted thereon through the sleeve 29a and to the chassis 1. The inner and outer bearing assemblies 33 and 34 are press-fit in sleeve 29a in an axially separated condition. Of course, bearing assemblies 33 and 34 could be maintained in their proper places by sectioning sleeve 29a so as to create varying diametric zones therein which accommodate bearing assemblies 33 and 34. Bearing assemblies 33 and 34 are sealed within sleeve 29a by outer shaft seals 36 and 37 respectively. As shown, bearing assemblies 33 and 34 are adapted to receive an elongated spring bushing shaft or pin 40 that extends through bushing assembly 21e. According to the preferred embodiment, bearing assemblies 33 and 34 incorporate needle roller bearing elements 41 which are desirable due to their known strength characteristics.

For the sake of completeness, in the preferred embodiment shown, sleeve 29a is approximately 3 to 4 inches (7.6 to 10.2 cm) long and has an outside diameter of approximately 1.25 to 2 inches (3.2 to 5 cm) and an inside diameter of approximately 1.0 to 1.5 inch (2.54 to 3.81 cm). The illustrated roller needle bearing elements 41 are approximately 1.25 inches (3.18 cm) long and 0.10 inches (0.25 cm) in diameter. Each bearing assembly 33 and 34 is comprised of approximately 29 roller needle bearing elements 41. By way of example only, such bearing assemblies 33 and 34 are available from Torrington Bearing Company.

The spring bushing shaft 40 includes fitting structure indicated at 44 which is adapted to be attached to a grease supply source (not shown) for delivering a lubricant into bushing assembly 21e. More specifically, shaft 40 is formed with a longitudinally extending, internal duct 45 that leads from fitting structure 44 to a radial duct 46. Radial duct 46 opens into a cavity 47 defined radially between sleeve 29a and shaft 40 intermediate bearing assemblies 33 and 34. With this arrangement, grease can be readily introduced into cavity 47 of bushing assembly 21e to prolong the useful life thereof. Again, for the sake of completeness, both ducts 45 and 46 have associated diameters in the order of approximately 0.025 inches (0.06 cm). Of course, it should be recognized that various other lubrication arrangements could be employed. Shaft 40 is also formed with semi-circular notched zones 48 into which bolts (not shown) are adapted to extend for non-rotatably attaching shaft 40 to chassis bracket 6 in the case of bushing assembly 21e.

As indicated above, much of the structure discussed up to this point is known in the art, particularly in U.S. Pat. No. 5,562,348 which has been incorporated by reference. The preferred form of the present invention is particularly directed to the specific construction of sleeve 29a, as well as the manner in which a roller bushing assembly incorporating such a sleeve construction can be advantageously utilized in rotatably mounting an out-of-round component, such as a spring eye, to a support, such as a chassis bracket.

Figure 4:
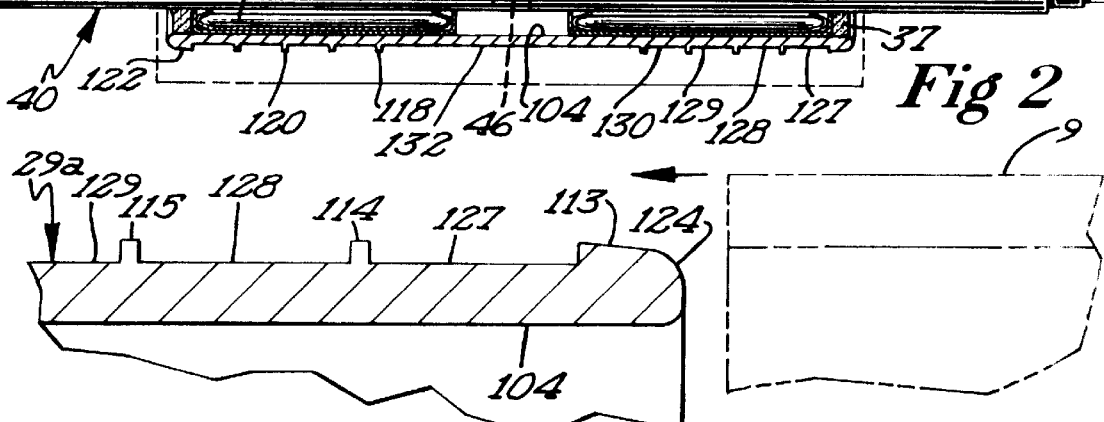
FIG. 4 is a partial cross-sectional view illustrating the alignment between the roller bushing assembly according to the first embodiment of the invention and the eye of the leaf spring prior to assembly.
Figure 5:
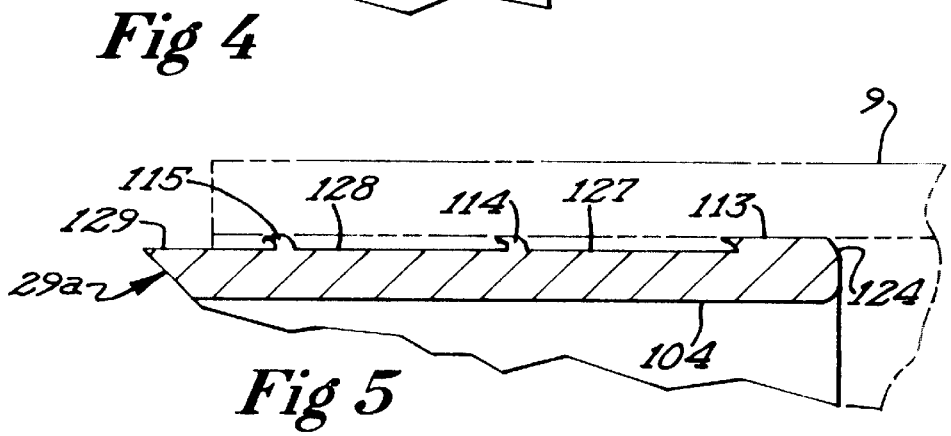
FIG. 5 is a partial cross-sectional view illustrating the partial insertion of the roller bushing assembly of the first embodiment within the eye of the leaf spring.

Referring now to FIGS. 2, 4 and 5, sleeve 29a is defined by a generally cylindrical outer surface 102 and a cylindrical inner surface 104. In the preferred embodiment, outer surface 102 and inner surface 104 are machined. In particular, inner surface 104 and shaft 40 are machined to low tolerances to enable precise mounting of bearing A assemblies 33 and 34. Outer surface 102 is formed with a plurality of axially spaced and radially extending ribs 113–122. In the preferred embodiment, ribs 113–122 are advantageously formed integral with sleeve 29a. More specifically, ribs 113–122 are formed by machining a plurality of axially spaced, annular grooves 127–130 at each axial end of sleeve 29a, as well as an elongated central groove 132, within outer surface 102. In accordance with the preferred embodiment shown, ribs 113 and 122 are provided at respective terminal axial ends of sleeve 29a and are elongated in an axial direction relative to ribs 114–121. In addition, ribs 113 and 122 are preferably chamfered at 124 and 125 respectively to ease mounting of sleeve 29a within a support, such as spring eye 9. However, it should be noted that forming a sleeve of a bushing assembly with chamfered ends to ease assembly thereof is known in the art.

As best illustrated in FIG. 2, ribs 113 and 122 are located axially outward from bearing assemblies 34 and 33 to accommodate seals 37 and 36 respectively. The remaining ribs 114–121 are arranged in first and second groups, with ribs 114–117 constituting a first group and ribs 118–121 constituting the second group. With this arrangement, the first group of ribs 114–117 can be advantageously located directly radially outward of bearing assembly 34 and the second group of ribs 118–121 are located directly radially outward of bearing assembly 33. This arrangement is preferred since it is the particular distortion of the inner surface 104 of sleeve 29a at bearing assemblies 33 and 34 which is to be avoided in order to prolong the useful life of roller bushing assembly 21e. For this reason, no ribs are provided in accordance with the embodiment shown axially intermediate bearing assemblies 33 and 34.

Ribs 113–122 are adapted to be readily sheared upon mounting of sleeve 29a within an out-of-round or otherwise distorted spring eye 9. More specifically, ribs 113–122 are designed so as to shear when roller bushing assembly 21e is press-fit within the distorted eye 9 of leaf spring 2 as illustrated by comparing FIGS. 4 and 5. If spring eye 9 of leaf spring 3 is either too small (low side of tolerance) or out-of-round, one or more ribs 113–122 will shear to assure a suitable interconnection between the roller bushing assembly 21e and the spring eye 9. Of course, only a certain number and percentage of ribs 113–122 may need to shear depending upon the actual distortion in size and shape of the particular spring eye 9. In addition, only an arcuate section of a given rib 113–122 may shear to a certain degree. Therefore, the number of ribs 113–122, ranging from none of the ribs to all of the ribs, which may shear, as well as the percentage of those ribs, can vary from application to application. In any event, this construction enables roller bushing assembly 21e to be readily mounted in spring eye 9 without the need of an expander. Therefore, not only do ribs 113–122 function to securely mount bushing assembly 21e within spring eye 9, but this shearing action will assure that bearing assemblies 33 and 34 will not be crushed or excessively preloaded upon installation.

In addition to realizing cost savings in the mounting of the roller bushing assemblies and expanding the useful lives thereof, forming bushing assembly 21e with sleeve 29a constructed in the manner set forth above provides for an enlarged tolerance between the mating parts. For example, as indicated above, sleeve 29a preferably has an outermost diameter of 1.25 to 2 inches (3.2 to 5 cm). However, ribs 113–122 preferably project from outer surface 102 of sleeve 29a approximately 0.030 inches (0.0762 cm). Therefore, sleeve 29a can be effectively mounted within spring eye 9 or another support with a substantially increased tolerance range. With this arrangement, it should be readily apparent that a single sized roller bushing assembly 21e can be mounted in supports having a fair size range which represents a significant cost savings from a manufacturing standpoint. In addition, since ribs 113–122 are integral with the remainder of sleeve 29a, there is no chance of the ribs 113–122 separating completely from sleeve 29a, other than through the permissible shearing action described.

Therefore, constructing sleeve 29a as described above enables bushing assembly 21e to be more versatile and reliable. With the inclusion of ribs 113–122, the tolerances of the outer surface 102 of sleeve 29a can be increased, i.e., essentially doubled in the preferred form from 0.0005 inches (0.00127 cm) for the corresponding sleeve disclosed in the '348 patent to 0.001 inches (0.00254 cm) in accordance with the present invention due to the available shearing feature. In addition, sleeve 29a can be made utilizing equipment already used to finish known sleeve arrangements and therefore constructing sleeve 29a in accordance with the present invention does not add any significant cost to the manufacturing of bushing assembly 21e.

Although bushing assembly 21e could be used in combination with a known shackle assembly, such as that disclosed in U.S. Pat. No. 5,562,348, to rotatably mount rear spring end 4 to chassis 1, reference now will be made to FIG. 3 in disclosing the preferred construction of shackle assembly 8a, as well as bushing assemblies 21d and 21f in accordance with a second preferred embodiment of the present invention. As illustrated, rear chassis bracket 7 includes an upstanding mounting plate portion 152 that is provided with a plurality of apertures, one of which is indicated at 155, for receiving bolts 10 in order to secure bracket 7 to chassis 1. Rear chassis bracket 7 also includes a base 158 that defines a cylindrical bore 161. As indicated above, shackle assembly 8a is used to mount the eye 5 of leaf spring 2 to rear chassis bracket 7. As shown, shackle assembly 8a includes a pair of spaced shackle links 164 and 165 that are adapted to be interconnected by means of a bolt 167. More specifically, each shackle link 164 and 165 is formed, at a central portion thereof, with a respective countersunk aperture 169 and 170 through which bolt 167 extends. In the preferred embodiment depicted, bolt 167 actually comprises a threaded rod with each end thereof being adapted to threadably receive a nut 172 and 173. In order to maintain a desired spacing between shackle links 164 and 165, a central spacer member 178, preferably formed integral with bolt 167, is positioned between shackle links 164 and 165. In the preferred embodiment, two such spacer members 178 are actually provided between shackle links 164 and 165. With this arrangement, the effective distance between shackle links 164 and 165 can be readily controlled based on the length of spacer member 178 and shackle links 164 and 165 can be readily pulled together by merely tightening of nuts 172 and 173. This simple construction is seen to be an improvement over prior known shackle arrangements which require the use of one or more C-clamps to interconnect the shackle links.

Each shackle link 164 and 165 is formed with upper and lower bearing pockets 182 and 183. Each bearing pocket 182 and 183 is generally cylindrical and has an associated depth preferably greater than half the width of the respective shackle link 164 and 165. Each of the bushing assemblies 21d and 21f according to the second embodiment of the present invention is identical in construction. Therefore, the preferred construction of bushing assembly 21f will now be described in detail and it is to be understood that bushing assembly 21d is correspondingly constructed.

Mounted within each of the bearing pockets 182 and 183 of shackle links 164 and 165 is a pre-assembled bearing unit, one of which is indicated at 186 and forms part of bushing assembly 21f. Each bearing unit 186 includes a planar disk 188, a roller bearing unit 192 that preferably incorporates needle bearings 194, a thrust bearing 196, a cap member 198 and a seal 200. More specifically, cap member 198 includes a body portion 202 having a first reduced diametric end portion 204 and a second reduced diametric end portion 206. Within body portion 202, cap member 198 defines an internal cavity 208. Thrust bearing 196 is adapted to be mounted about first, reduced diametric end portion 204 and the entire cap member 198 is positioned within roller bearing 192 so as to be in contact with needle bearings 194. Roller bearing 192 itself is press-fit within a respective bearing pocket 182 and 183 such that a housing 210 of roller bearing 192 is fixed against rotation relative to a respective shackle link 164 and 165. With this construction, each cap member 198 is adapted to rotate relative to a respective shackle link 164 and 165 through needle bearings 194.

At this point, it should be noted that pre-assembling of bearing unit 186 not only advantageously minimizes the number of parts needed to assemble when rotatably interconnecting spring eye 5 to chassis 1 through roller bushing assemblies 21d and 21e, shackle assembly 8a and chassis bracket 7 but, when pre-assembled, roller bearing 192 can be initially greased at a factory or other assembly plant and then the entire bearing unit 186 can be sealed for life by positioning seal member 200 about second reduced diametric end portion 206 of cap member 198 in abutting relationship with housing 210 of roller bearing 192. Therefore, instead of requiring frequent lubrication as commonly required for bearing units of standard shackle assemblies used for mounting leaf springs to truck chassis, bearing units 186 will require no maintenance.

Bushing assembly 21f also includes a bushing member in the form of a pin 216 having a central body portion 218 from which extend opposing, terminal stub shafts 222 and 223. Stub shaft 222 is preferably larger in diameter than stub shaft 223 and is chamfered at 228. Formed at the juncture of stub shaft 222 and central body portion 218 is an annular flange 230. In a manner similar to sleeve 29a of bushing assembly 21e described above, pin 216 is formed with a plurality of ribs 232–240 with ribs 232–235 representing a first group of ribs and ribs 236–240 representing a second group of ribs. Ribs 232–240 are preferably integrally formed with pin 216 by machining the outer cylindrical surface of pin 216 to include a plurality of longitudinally spaced grooves 242–250. As shown, annular groove 246 constitutes a central groove that is axially longer than remaining grooves 242–245 and 247–250. In addition, rib 240 has an associated axial length which is greater than that of the remaining ribs 232–239 and rib 240 is preferably chamfered at 252 to assist mounting of pin 216.

Each pin 216 is adapted to be press-fit, beginning with the side of pin 216 including stub shaft 223, in one of eyelet 5 of leaf spring 2 in the case of bushing assembly 21f or cylindrical bore 161 of chassis bracket 7 in the case of bushing assembly 21d. In either case, ribs 232–240 will be permitted to shear as needed to compensate for any size and shape distortions of either eyelet 5 or bore 161 such that each pin 216 can be frictionally, non-rotatably mounted independent of whether the eyelet 5 or bore 161 is of an ideal size and shape or not. Therefore, in a manner directly analogous to the mounting of sleeve 29a, pin 216 can be mounted in a support member bore that has the size and shape within a predetermined tolerance range from an ideal size and shape. When mounting pin 216, annular flange 230 limits the degree of axial insertion due to its abutment with either the eyelet 5 or base 158.

Once pin 216 is mounted in a manner described above, cap member 256 is adapted to be secured upon stub shaft 223 until an annular flange 258 of cap member 256 also abuts the respective eyelet 5 or base 158 in a manner directly analogous to annular flange 230. In a preferred embodiment, stub shaft 223 is externally threaded and cap member 256 is internally threaded. In any event, cap member 256 is adapted to combine with annular flange 230 to clamp spring eye 5 in the case of bushing assembly 21f in order to securely retain pin 216 in the desired axial position.

Once a corresponding pin 216 is mounted in each of eyelet 5 and bore 161 and a respective cap member 256 is mounted in place, shackle links 164 and 165 can be positioned so as to align each of the pockets 182 and 183 with the respective stub shafts 222 and 223. Of course, a respective bearing unit 186 will have been pre-assembled and mounted within each of the pockets 182 and 183. Shackle links 164 and 165 can then be pressed axially such that each stub shaft 222 is press-fit within a respective cap member 198 so as to be non-rotatably mounted therein. In addition, each cap member 256, carried by a respective stub shaft 223, is press-fit within a corresponding cap member 198. With rear end chassis bracket 7 already attached to chassis 1 through bolts 10, the positioning of bolt 167 and the tightening of nuts 172 and 173 will thereby complete the interconnection between rear spring end 4 and chassis 1 with bushing assemblies 21d and 21f permitting relative rotational movement between both shackle assembly 8a and eye 5 of leaf spring 2 relative to chassis 1.

With the pre-assembly of bearing units 186 and the manner in which shackle links 164 and 165 are interconnected, mounting leaf spring 2 to chassis bracket 7 for relative rotatable movement through shackle assembly 8a and the bushing assemblies 21d and 21f in accordance with the present invention can be carried out with a minimum number of parts such that an economically viable and efficient arrangement is provided. This embodiment of the invention also benefits as bearing units 186 themselves are not pressed into an out-of-round or small tolerance sized bore. Therefore, any possibility of excessively pre-loading of bearing units 186 is avoided. The incorporation of thrust bearings 196 enable bushing assemblies 21d and 21f to handle all side loading and, in combination with roller bearings 194, eliminates sliding wear surfaces thereby reducing friction to a minimum.

Furthermore, constructing bushing assemblies 21d and 21f in the manner set forth above advantageously enables a single sized pin 216 to be used for essentially all applications. Current pins utilized in mounting leaf springs to truck chassis, for example, as set forth in U.S. Pat. No. 5,562,348, vary in size depending upon the application. In general, such known pins have a rating ranging from 12,000–20,000 lbs. Therefore, with the known prior art, the diameters of the pins are correspondingly increased for larger rating applications. However, constructing bushing assemblies 21d and 21f in accordance with the present invention enables pin 216 to be diametrically enlarged, as compared to a pin that is put through a sleeve, while still being usable with standard sized spring eyes. In this manner, a uniformly sized pin having a 20,000 lb. rating is attainable for all applications. This feature advantageously provides for standardization of parts which, in turn, results in reduced production costs.

Now that the basic teachings of the roller bushing assembly according to the preferred embodiments of the present invention have been set forth, other variations will be obvious to persons skilled in the art. For instance, bushing assemblies 21d, 21e and 21f may take various forms in accordance with the invention. It is simply important to note that the ribs are provided on the outer surface of the bushing assembly member which is frictionally fit within the distorted or out-of-round support and that the bushing assembly, as a whole, permits relative rotational movement between two components. In addition, it should be realized that the relative axial lengths of ribs and grooves as mentioned above are for illustrative purposes and can be altered in accordance with the present invention. However, the presence of the grooves is important as the grooves provide zones into which shearing portions of the ribs can project. In addition, in the case of bushing assembly 21e, this avoids undesirably compressing ribs 113–122 radially which could damage bearing assemblies 33 and 34 as discussed above.

Thus the invention disclosed herein may be embodied in other specific forms without departing from the spirit or general characteristics thereof, some of which forms have been indicated, the embodiments described herein which should be considered in all respects illustrative and not restrictive. The scope of the invention is to be indicated by the appended claims, rather than by the foregoing description, and all changes which come within the meaning and range of equivalence of the claims are intended to be embraced therein.

We claim:

1. An assembly for rotatably mounting a suspension member, having first and second ends each formed with an internal bore, to a vehicle body through first and second support members adapted to extend between the vehicle body and the suspension member, comprising, in combination: a first roller bushing assembly including a first bushing member adapted to be non-rotatably mounted within the internal bore formed in the first end of the suspension member, a first roller bearing unit mounted within the first bushing member, and an elongated bushing member being rotatably mounted within the first bushing member through the first roller bearing unit, with the elongated bushing member having opposing terminal ends projecting from the first bushing member that are adapted to be fixedly secured to the first support member; a pair of shackle links each having first and second end portions, with the first end portion of each shackle link being adapted to be rotatably attached to the second support member and the second end portion of each shackle link being formed with a bearing pocket; and a second roller bushing assembly including a second bushing member adapted to be non-rotatably mounted within the internal bore formed in the second end of the suspension member and second roller bearing units each of which is mounted in a respective one of the bearing pockets, with the second bushing member including first and second end portions projecting out of the internal bore formed in the second end of the suspension member and being rotatably attached to the shackle links, within the bearing pockets, through the second roller bearing units.

2. The assembly of claim 1, further comprising, in combination: means for interconnecting the pair of shackle links intermediate the first and second end portions of each shackle link.

3. The assembly of claim 2, wherein the interconnecting means includes a threaded fastener having a spacer member of a predetermined length, with the spacer member being positioned between the pair of shackle links and the threaded fastener extending through each of the shackle links such that the pair of shackle links are spaced a distance determined by the length of the spacer member.

4. The assembly of claim 1, wherein the first bushing member is constituted by a sleeve having a generally cylindrical inner surface and a generally cylindrical outer surface, with a plurality of axially spaced, shearable ribs being fixed to and extending radially from the generally cylindrical outer surface of the sleeve wherein, when the first bushing member is mounted within the internal bore formed in the first end of the suspension member, the ribs will shear to compensate for size and shape distortions of the internal bore thereby enabling the sleeve to be frictionally, non-rotatably mounted within the internal bore.

5. The assembly of claim 4, wherein each of the ribs extends annularly about the generally cylindrical outer surface of the sleeve.

6. The assembly of claim 5, further comprising, in combination: an additional roller bearing unit mounted within the sleeve in spaced axial relationship with the first roller bearing unit, with the plurality of ribs being arranged in first and second groups which are located directly radially outward of the first and additional roller bearing units respectively.

7. The assembly of claim 1, wherein the second bushing member is constituted by a pin having a generally cylindrical outer surface, with a plurality of axially spaced, shearable ribs fixed to and extending radially from the generally cylindrical outer surface of the pin wherein, when the second bushing member is mounted within the internal bore formed in the second end of the suspension member, the ribs will shear to compensate for size and shape distortions of the internal bore thereby enabling the pin to be frictionally, non-rotatably mounted within the internal bore.

8. The assembly of claim 7, wherein each of the ribs extends annularly about the generally cylindrical outer surface of the pin.

9. The assembly of claim 7, wherein the pin has a central body portion from which radially extend the shearable ribs and which terminates in a pair of axially spaced stub shafts, with a first one of the stub shafts being directly received within the second roller bearing unit mounted in one of the bearing pockets, with the second roller bushing assembly also including a cap member mounted upon a second one of the stub shafts, with the second one of the stub shafts being rotatably mounted within a respective one of the second roller bearing units, within a respective bearing pocket, through the cap member.

10. The assembly of claim 9, wherein the cap member is threadably secured to the second one of the stub shafts.

11. The assembly of claim 1, wherein each of the second roller bearing units comprises, in combination: a roller bearing, a thrust bearing and a cap member, with the roller bearing being positioned radially about the cap member within the bearing pocket, the thrust bearing being positioned within the bearing pocket axially between the shackle link and the cap member and the cap member including a cavity adapted to non-rotatably receive a respective one of the stub shafts therein.

12. The assembly of claim 11, wherein each of the second bearing units further includes a disk axially interposed between a respective bearing pocket and the thrust bearing.

13. The assembly of claim 11, wherein the thrust bearing is mounted upon a reduced diametric portion of the cap member.

14. The assembly of claim 13, wherein each second bearing unit further comprises, in combination: a seal mounted upon a second reduced diametric portion of the cap member.

15. A roller bushing assembly adapted to be non-rotatably mounted in a bore of a support member, with the bore having a size and shape within a predetermined tolerance range, comprising, in combination: a sleeve having a generally cylindrical inner surface and a generally cylindrical outer surface; a plurality of axially spaced, shearable ribs fixed to and extending radially from the generally cylindrical outer surface of the sleeve; and at least one bearing assembly mounted against the generally cylindrical inner surface of the sleeve wherein, when the roller bushing assembly is mounted within the bore of the support member and the bore of the support member is not within the predetermined tolerance range, the ribs will shear to compensate for size and shape distortions of the bore of the support member thereby enabling the sleeve to be frictionally, non-rotatably mounted within the bore of the support member independent of whether the bore of the support member is within the predetermined tolerance range or not.

16. The roller bushing assembly of claim 15, wherein each of the ribs extends annularly about the generally cylindrical outer surface of the sleeve.

17. The roller bushing assembly of claim 15, wherein the sleeve includes first and second axially spaced ends, with the generally cylindrical outer surface of the sleeve including at least six axially spaced ribs extending therefrom.

18. The roller bushing assembly of claim 15, wherein the at least one bearing assembly includes first and second roller bearing units mounted in spaced axial positions within the sleeve, with the plurality of ribs being arranged in first and second groups which are located directly radially outward of the first and second roller bearing units respectively.

19. The roller bushing assembly of claim 15, wherein the ribs are integral with the sleeve.

20. The roller bushing assembly of claim 15, wherein the ribs project radially from the outer surface of the sleeve, prior to being sheared, approximately 0.030 inches (0.0762 cm).

21. An assembly for rotatably mounting a suspension member to a vehicle body through a support member adapted to extend between the vehicle body and the suspension member, with the suspension member including an end formed with an internal bore, comprising, in combination: a roller bushing assembly including a bushing member having a generally cylindrical outer surface, with the bushing member being adapted to be press-fit within the internal bore to non-rotatably mount the bushing member to the suspension member; a plurality of axially spaced ribs extending radially from the generally cylindrical outer surface of the bushing member, with the ribs being adapted to shear as the bushing member is press-fit within the internal bore of the suspension member to compensate for size and shape distortions of the internal bore; and at least one bearing assembly operatively interconnected between the bushing member and the support member to rotatably attach the suspension member to the vehicle body through the bushing member, the at least one bearing assembly and the support member.

22. The assembly of claim 21, wherein the suspension member is a leaf spring and the internal bore is defined by an eye of the leaf spring, with the bushing member being adapted to be press-fit within the eye to non-rotatably mount the bushing member to the leaf spring.

23. The assembly of claim 21, wherein the support member is a bracket adapted to be attached to a truck chassis.

24. The assembly of claim 21, wherein each of the ribs extends annularly about the generally cylindrical outer surface of the bushing member.

25. The assembly of claim 21, wherein the bushing member includes first and second axially spaced ends, with the generally cylindrical outer surface of the bushing member including at least six axially spaced ribs extending therefrom.

26. The assembly of claim 21, wherein the bushing member comprises a sleeve and the at least one bearing assembly includes first and second roller bearing units mounted in spaced axial positions within the sleeve, with the plurality of ribs being arranged in first and second groups which are located directly radially outward of the first and second roller bearing units respectively.

27. The assembly of claim 26, wherein the first and second roller bearing units are axially spaced within the sleeve, with the outer surface of the sleeve being void of any ribs axially intermediate the first and second roller bearing units.

28. The assembly of claim 21, wherein the support member comprises a shackle assembly including a pair of axially spaced shackle links formed with a pair of opposing bearing pockets, the bushing member comprises a pin, and the at least one bearing assembly includes a roller bearing, a thrust bearing and a cap member, with the roller bearing being positioned radially about the cap member within the bearing pocket, the thrust bearing being positioned within the bearing pocket axially between the shackle link and the cap member and the cap member including a cavity adapted to non-rotatably receive an end portion of th e pin.

29. The assembly of claim 21, wherein the ribs are integral with the bushing member.

30. The assembly of claim 21, wherein the ribs project radially from the generally cylindrical outer surface of the bushing member, prior to being sheared, approximately 0.030 inches (0.0762 cm).

31. A combination shackle and bushing assembly for rotatably attaching a first member having an internal bore to a support comprising, in combination: a shackle assembly including a pair of shackle links each having first and second end portions, with the first end portion of each shackle link being adapted to rotate relative to the support and the second end portion of each shackle link being formed with a bearing pocket; a bearing unit mounted in each of the bearing pockets; a bushing assembly including a bushing member in the form of a pin having a central body portion and first and second axially spaced stub shafts; a first flange between the central body portion and the first stub shaft; and an internally threaded cap member including a second flange, with the second stub shaft being externally threaded for threaded receipt of the internally threaded cap member, with the central body portion of the bushing member being adapted to be non-rotatably mounted within the internal bore of the first member with the first member being clamped between the first and second flanges, with the stub shafts projecting out respective axial ends of the internal bore and being rotatably mounted within a respective one of the bearing pockets through a respective bearing unit.

32. The combination shackle and bushing assembly of claim 31, further comprising, in combination: means for interconnecting the pair of shackle links intermediate the first and second end portions of each shackle link.

33. The combination shackle and bushing assembly of claim 32, wherein the interconnecting means includes a threaded fastener having a spacer member of a predetermined length, with the spacer member being positioned between the pair of shackle links and the threaded fastener extending through each of the shackle links such that the pair of shackle links are spaced a distance determined by the length of the spacer member.

34. The combination shackle and bushing assembly of claim 31, wherein the central body portion of the pin has a generally cylindrical outer surface provided with a plurality of axially spaced, shearable ribs extending radially therefrom such that, when the pin is mounted within the internal bore of the first member, the ribs will shear to compensate for size and shape distortions of the bore thereby enabling the pin to be frictionally, non-rotatably mounted within the bore of the first member.

35. The combination shackle and bushing assembly of claim 34, wherein each of the ribs extends annularly about the generally cylindrical outer surface of the pin.

36. The combination shackle and bushing assembly of claim 34, wherein the first stub shaft is directly received within the bearing unit mounted in one of the bearing pockets and the first flange is integrally formed between the first stub shaft and the central body portion.

37. The combination shackle and bushing assembly of claim 31 wherein each bearing unit includes a roller bearing positioned radially outward of the stub shaft.

38. A combination shackle and bushing assembly for rotatable attaching a first member having an internal bore to a support member, in combination: a shackle assembly including a pair of shackle links each having first and second end portions, with the first end portion of each shackle link being adapted to rotate relative to the support and the second end portion of each shackle link being formed with a bearing pocket; a roller bearing unit mounted in each of the bearing pockets; and a bushing assembly including a bushing member in the form of a pin having a central body portion and a pair of axially spaced stub shafts, with the central body portion of the bushing member being adapted to be non-rotatably mounted within the internal bore of the first member, with the stub shafts protecting out respective axial ends of the internal bore and being rotatable mounted within a respective one of the bearing pockets through a respective roller bearing unit, wherein each of the roller bearing units comprises, in combination: a roller bearing, a thrust bearing and a cap member, with the roller bearing being positioned radially about the cap member within the bearing pocket, the thrust bearing being positioned within the bearing pocket axially between the shackle link and the cap member and the cap member including a cavity adapted to non-rotatably receive a respective one of the stub shafts therein.

39. The combination shackle and bushing assembly of claim 38, wherein each of the bearing units further includes a disk axially interposed between a respective bearing pocket and the thrust bearing.

40. The combination shackle and bushing assembly of claim 38, wherein the thrust bearing is mounted upon a reduced diametric portion of the cap member.

41. The combination shackle and bushing assembly of claim 40, wherein the bearing unit further comprises, in combination: a seal mounted upon a second reduced diametric portion of the cap member.

42. A method of mounting at least a portion of a roller bushing assembly within a bore of a support member, with the bore having a size and shape within a predetermined tolerance range, comprising the steps of: providing a roller bushing assembly including a bushing member including a generally cylindrical outer surface having a plurality of axially spaced, shearable ribs extending radially therefrom; and press-fitting the bushing member into the bore of the support member while shearing off a portion of at least one of the ribs as the bushing member moves into the bore so as to non-rotatably mount the bushing member within the bore.

43. The method of claim 42, further comprising: integrally forming the plurality of ribs with the bushing member.

44. The method of claim 43 further comprising: forming the plurality of ribs on the generally cylindrical outer surface of the bushing member by machining axially spaced grooves in the generally cylindrical outer surface such that each of the ribs is defined by respective ones of the grooves.

* * * * *

UNITED STATES PATENT AND TRADEMARK OFFICE
CERTIFICATE OF CORRECTION

PATENT NO : 5,897,107

DATED : April 27, 1999

INVENTOR(S) : Zierden et al.

It is certified that error appears in the above-identified patent and that said Letters Patent is hereby corrected as shown below:

In Column 15, line 18, delete "rotatable" and insert -- rotatably -- .

In Column 15, line 30, delete "protecting" and insert -- projecting --.

In Column 15, line 31, delete "rotatable" and insert -- rotatably --.

Signed and Sealed this

Thirtieth Day of November, 1999

Attest:

Q. TODD DICKINSON

*Attesting Officer*  *Acting Commissioner of Patents and Trademarks*